(12) United States Patent
Stadlmann

(10) Patent No.: US 12,479,162 B2
(45) Date of Patent: Nov. 25, 2025

(54) SYSTEM AND METHOD FOR SUPERVISED POST-PROCESSING

(71) Applicant: DENTSPLY SIRONA Inc., York, PA (US)

(72) Inventor: Klaus Stadlmann, Vienna (AT)

(73) Assignee: Dentsply Sirona Inc., York, PA (US)

( * ) Notice: Subject to any disclaimer, the term of this patent is extended or adjusted under 35 U.S.C. 154(b) by 0 days.

(21) Appl. No.: 17/775,659

(22) PCT Filed: Nov. 16, 2020

(86) PCT No.: PCT/EP2020/082271
§ 371 (c)(1),
(2) Date: May 10, 2022

(87) PCT Pub. No.: WO2021/094613
PCT Pub. Date: May 20, 2021

(65) Prior Publication Data
US 2022/0402211 A1 Dec. 22, 2022

(30) Foreign Application Priority Data
Nov. 15, 2019 (AT) .............. A 50989/2019

(51) Int. Cl.
*B29C 64/00* (2017.01)
*B08B 3/10* (2006.01)
(Continued)

(52) U.S. Cl.
CPC .............. *B29C 64/35* (2017.08); *B08B 3/102* (2013.01); *B08B 13/00* (2013.01); *B29C 64/386* (2017.08);
(Continued)

(58) Field of Classification Search
CPC ....... B29C 64/35; B29C 64/386; B29C 71/04; B29C 64/124; B29C 64/245;
(Continued)

(56) References Cited

U.S. PATENT DOCUMENTS

2009/0283109 A1  11/2009  Moussa
2018/0297285 A1  10/2018  Sheppard
(Continued)

FOREIGN PATENT DOCUMENTS

EP  1876012 A1  1/2008
EP  3521003 A1  8/2019
(Continued)

OTHER PUBLICATIONS

International Search Report; PCT/EP2020/082271; Feb. 24, 2021 (completed) Mar. 11, 2021 (mailed).
(Continued)

*Primary Examiner* — Erin F Bergner
(74) *Attorney, Agent, or Firm* — SCHWEGMAN LUNDBERG & WOESSNER, P.A.

(57) ABSTRACT

A system and method for cleaning and/or post-exposure of a body manufactured by using an additive manufacturing method from a substance curable by radiation, the system including a cleaning tank for cleaning the body and/or an exposure chamber for post-exposure of the body, the system further including a transport device having a drive for moving a build platform relative to the cleaning tank and/or to the exposure chamber. The transport device includes a force sensor, the force sensor captures a force acting on the build platform and provides a force signal, and is connected to a processing unit for controlling the drive and/or for outputting process parameters based on the force signal.

5 Claims, 14 Drawing Sheets

(51) Int. Cl.
*B08B 13/00* (2006.01)
*B29C 64/35* (2017.01)
*B29C 64/386* (2017.01)
*B29C 71/04* (2006.01)
*B33Y 40/20* (2020.01)
*B33Y 50/00* (2015.01)

(52) U.S. Cl.
CPC .............. *B29C 71/04* (2013.01); *B33Y 40/20* (2020.01); *B33Y 50/00* (2014.12)

(58) Field of Classification Search
CPC . B29C 64/393; B29C 71/0009; B29C 64/343; B08B 3/102; B08B 13/00; B33Y 40/20; B33Y 50/00; B33Y 30/00; B33Y 50/02; B33Y 10/00
See application file for complete search history.

(56) References Cited

U.S. PATENT DOCUMENTS

| | | | | |
|---|---|---|---|---|
| 2019/0240924 A1* | 8/2019 | Hendrik | ................ | B33Y 40/20 |
| 2020/0001536 A1* | 1/2020 | DeSimone | ............ | B29C 64/295 |
| 2020/0078831 A1* | 3/2020 | Converse | ................ | B29C 64/20 |
| 2020/0324479 A1* | 10/2020 | Friedrich | ................ | B22F 10/12 |
| 2021/0086450 A1* | 3/2021 | Murillo | .................. | B33Y 10/00 |

FOREIGN PATENT DOCUMENTS

| | | | | |
|---|---|---|---|---|
| KR | 20200023712 A | 3/2020 | | |
| WO | 2018111548 A1 | 6/2018 | | |
| WO | 2018169821 A1 | 9/2018 | | |
| WO | 2018169824 A1 | 9/2018 | | |
| WO | WO-2019209732 A1 * | 10/2019 | ............... | B08B 7/02 |
| WO | 2021094613 | 5/2021 | | |

OTHER PUBLICATIONS

International Preliminary Report on Patentability; PCT/EP2020/082271; Feb. 24, 2021 (completed) Mar. 11, 2021 (mailed).
Written Opinion of the International Searching Authority; PCT/EP2020/082271; Feb. 24, 2021 (completed) Mar. 11, 2021 (mailed).
Chinese Office Action dated Dec. 27, 2023.
"International Application Serial No. PCT EP2020 082271, Written Opinion mailed Jul. 16, 2021", 6 pgs.
"International Application Serial No. PCT EP2020 082271, Response filed Sep. 16, 2021 to Written Opinion mailed Jul. 16, 2021", 24 pgs.

* cited by examiner

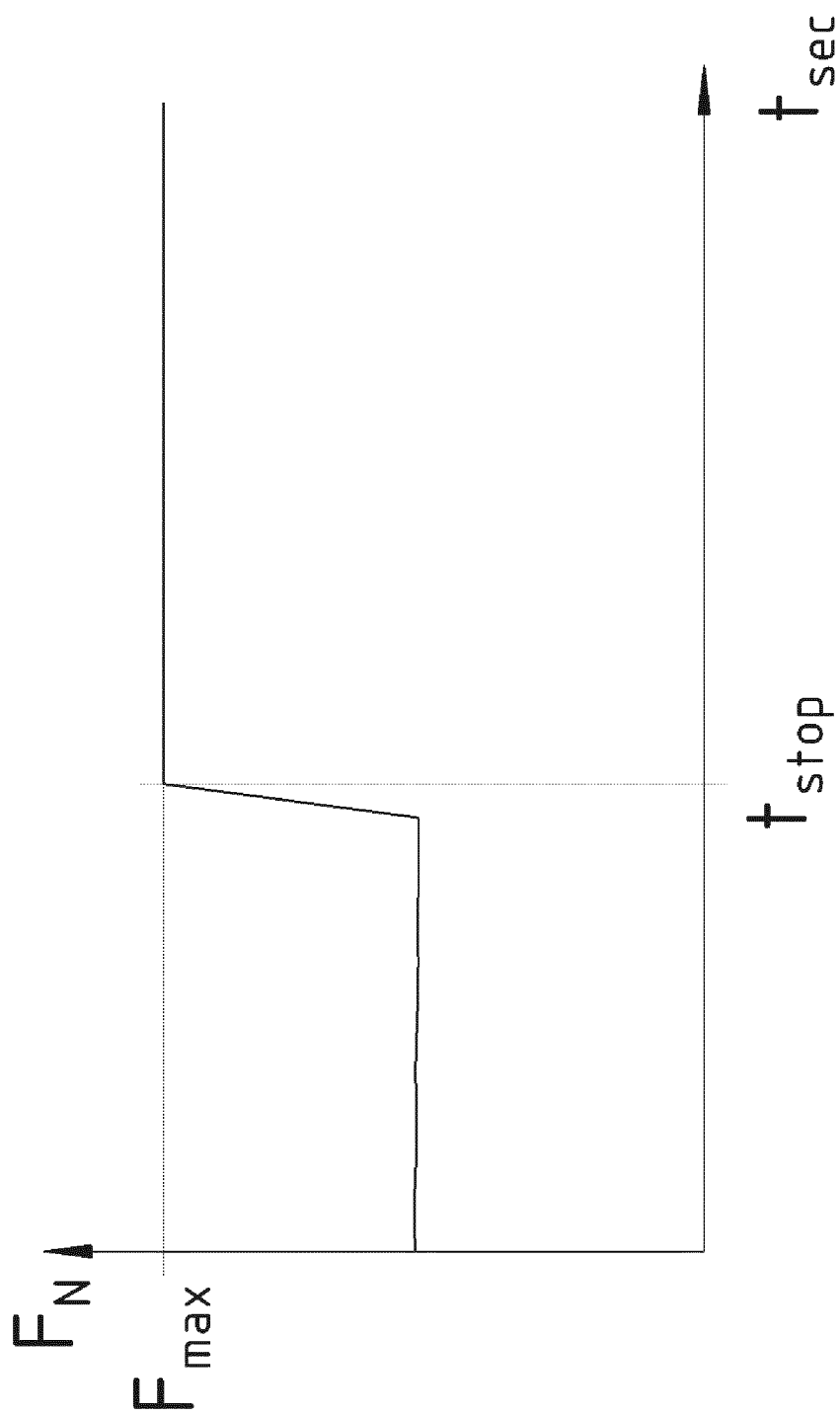

SYSTEM AND METHOD FOR SUPERVISED POST-PROCESSING

CROSS-REFERENCE TO RELATED APPLICATIONS

This is a National Phase application of International Application No. PCT/EP2020/082271, filed Nov. 16, 2020, which claims the benefit of and priority to Austrian Application Ser. No. A50989/2019, filed on Nov. 15, 2019, which are herein incorporated by reference for all purposes.

TECHNICAL FIELD

The invention relates to a system for cleaning and/or post-exposure of a body manufactured by means of an additive manufacturing method from a substance curable by radiation, the system comprising a cleaning tank for cleaning the body and/or an exposure chamber for post-exposure of the body, the system further comprising a transport device having a drive for moving a build platform relative to the cleaning tank and/or to the exposure chamber.

The invention also relates to a method for cleaning and/or post-exposure of a body manufactured by means of an additive manufacturing method from a substance curable by radiation in a cleaning tank or in an exposure chamber, the body on a build platform being moved relative to the cleaning tank and/or to the exposure chamber by a transport device having a drive.

The system can, for example, be part of equipment for automatic cleaning and/or post-exposure. The bodies in question can typically be built up in layers. The transport device corresponds to kinematics for moving the body along at least one axis. The build platform can be detachably connected to the transport device and, for example, coupled to the transport device using a gripping mechanism or a locking.

BACKGROUND

Devices and methods for additive manufacturing or for building up a three-dimensional (3D) body in layers from a substance curable (that is, photosensitive) by radiation are also known under the terms 3D printing, additive manufacturing or rapid prototyping. The cross-sectional information of the substance to be cured in layers by electromagnetic radiation of suitable wavelength and intensity, for example, a photo resin, is thereby generally created by a mask projection method or by a laser source. In generative production machines that enable such a printing process, pixel-controlled DLP (digital light processing), MEMS (micro-electromechanical systems), LC (liquid crystal) displays, LED displays or controllable lasers are mostly used for the exposure of the cross-section or the individual layers. The exposure thereby generates a solid layer from the liquid, photosensitive substance. This layer thereby adheres to a carrier (for example, a build platform or a layer produced earlier) and is detached or removed from a reference surface by lifting the carrier. In all subsequent production steps, the cured layer, on its part, detached from the reference surface, functions as a carrier. A three-dimensional body is thus successively drawn from the photosensitive substance and thereby manufactured.

After the successful printing process, the three-dimensional body produced, which is still a green compact, must be appropriately cleaned, dried, tempered and finally post-exposed, depending on the material, in order to obtain an end product/end component having appropriate mechanical parameters and a stable geometry. These steps, that is, particularly cleaning ("washing") and post-exposure, are known under the collective term "post-processing". The method disclosed here is used for said post-processing of at least one body, built up in layers, made of a substance curable by radiation, for example, a resin cured by light, which adheres to the build platform. For each body formed, that is, produced by curing in layers with light, a corresponding post-processing must be carried out in order to make a component having fixed and defined mechanical properties from the manufactured body. The present disclosure relates in particular to post-processing, i.e. when the body is finished in terms of stacked layers. During post-processing, no additional layers are added to the layer stack forming the green compact.

First of all, the body is cleaned of uncured and liquid photo resin that is still wetting the surface. This cleaning can be done in one or in a plurality of washing processes. After washing has been carried out, the body is freed of the cleaning agent, for example, by blowing it off or evaporating it at an elevated temperature. Depending on the cleaning agent, this evaporates even at room temperature. The dry, cleaned body is then placed in a post-exposure unit. The post-exposure unit here has a radiation source which emits radiation of suitable intensity and wavelength that is capable of further crosslinking the green compact/body. The post-curing can take place under a protective gas atmosphere, for example, under a nitrogen atmosphere. The post-exposure is carried out for a designated period of time, depending on the material and component. After the post-exposure, the body has reached its final mechanical strength or final properties and can be used for the intended end purpose.

A known problem here is the lack of information on how the green compact behaves during post-processing or whether problems have occurred during automated post-processing. Accordingly, it is usually trusted that the body will not detach itself from the build platform during the post-processing steps and that no other problems will arise.

EP 1876012 A1 relates to a device for manufacturing a three-dimensional body by solidifying a curable material above a reference surface, using a radiation source of suitable wavelength, a build platform, a container for receiving curable material, a flexible film or a foil in the building region of the body, a displacement device for displacing the build platform, a force sensor and a control unit connected to the force sensor for controlling the displacement device. The force sensor is arranged in order to measure a force or a parameter related to the force between the manufactured foody and the reference surface during the printing process. The measured value is output to the control unit in order to adapt the movement or the movement speed of the build platform by means of the displacement device. As soon as and as long as the body is detached from the reference surface and does not touch it, the force sensor does not provide any useful information on the state of the body or the build platform.

US 2018/297285 A1 concerns a similar arrangement including a force sensor, also for additive manufacturing, whereby the task of a higher printing speed is more important compared to EP 1876012 A1. The force sensor is used to capture the force during detachment of the manufactured body and/or detect the moment of detachment.

KR 20200023713 A also deals with additive manufacturing and the problem of detachment of the last produced layer. It discloses a method for determining the thickness of the last produced layer by means of a force measurement.

US 2009/0283109 A1 shows a device for cleaning and post-exposure of bodies made of photo resin that are built up in layers. This is equipment that applies cleaning agent, via a spray head, to additively manufactured bodies which have already been detached from the build platform, in a basket that is mounted rotatably and pivotably. The equipment has a radiation source for post-crosslinking of the body, which brings radiation onto the body from above. The rotation of the body made possible by the equipment is used both for drying the foody and for post-crosslinking.

EP 3521003 A1 describes a post-exposure arrangement for generative components which includes a post-exposure unit and a cleaning station in the vertical direction. In this case, the two sections are connected by a closable passage. The equipment has a control device which controls the lifting device, the closure between the chambers, and the cleaning and post-exposure station. The focus is on the space-saving vertical arrangement in this prior art.

WO2019/209732A1 discloses a resin extractor for additive manufacturing. The excess resin is centrifugally separated from the surface of the printed object by spinning a rotor to which a carrier platform having the object connected thereto is mounted.

Known devices and methods for post-processing of bodies built up in layers are not completely automated and do not allow any capturing and/or control of individual process parameters based thereon. There is a need for improved and completely automated post-processing devices, particularly for automation and control of post-processing parameters that are reliable through the capturing of critical data.

SUMMARY

It is an object of the invention to create a device and a method as specified at the outset which, in the simplest and most reliable way possible, monitors and optionally controls a fully automatic, post-processing device and thus enables fast and reliable post-processing of bodies built up in layers with the least possible waste.

For this purpose, the invention provides a method as defined in the independent claim of the present application. Advantageous embodiments and developments are specified in the dependent claims.

In a system of the type mentioned at the outset, according to the invention, it is provided that the transport device has a force sensor, the force sensor being configured to capture a force acting on the build platform and provide a force signal, and being connected to a processing unit for controlling the drive and/or for outputting process parameters based on the force signal. For example, the force sensor can be configured to capture a force acting on the build platform during and/or after post-processing (e.g. cleaning and/or post-exposure) of the body and the processing unit can be configured to control the drive and/or output process parameters based on the force signal during and/or after post-processing of the body.

In a method of the type mentioned at the outset, according to the invention, a force acting on the build platform is captured using a force sensor providing a force signal during and/or after cleaning and/or post-exposure, and a processing unit, connected to the force sensor controls the drive and/or outputs a process parameter based on the force signal. The method relates particularly to an application to bodies which have not yet been completely post processed, that is, not yet completely cleaned and cured.

In general, the force sensor (more precisely: at least one force sensor) can be configured to measure a force signal in at least one spatial direction, the force signal acting on the build platform and/or on a body carried by the build platform. In this context, a force sensor is understood to be any sensor that captures the force or a parameter that is related to the force and from which a force can be derived or detected (which corresponds to an indirect force measurement). The invention is not restricted to a specific physical measuring principle.

The force that can be captured or detected by the force sensor can particularly comprise a force transmitted via the transport device, for example, between a drive of the transport device and the build platform or on a fastening of the build platform or on a fastening of the transport device. In principle, the force sensor can be designed and placed in order to measure at least one force component (that is, in at least one spatial direction) that acts on the build platform and/or on the body during and after the cleaning and post-exposure process.

The processing unit can have a microprocessor or a microcontroller. In addition, the processing unit can be connected to a data memory which contains data and/or program commands for processing the force values captured using the force sensor. The processing unit can be connected to an input/output device, for example, a touchscreen, for the operation of the processing unit by an operator. Actions required for the manufacture or post-processing of the 3D body can be executed automatically by providing the processing unit. In contrast, these actions would have to be performed manually by an operator without the processing unit, for which purpose the force sensor can be connected at least to a display unit for outputting the captured values.

The drive for moving the build platform can generally be any actuator. For example, it can be a drive unit for a height-adjustable build platform. In the case of a control of the drive using the processing unit, the processing unit can thus be configured, for example, to control the drive unit for the height-adjustable build platform as a function of the force signal captured using the force sensor. The force values captured by the force sensor can be transmitted to and processed in the processing unit. Conversely, the processing unit can be configured to process the value captured by the force sensor, for example, the force signal of the force sensor, and to obtain or receive it for this purpose. When the processing unit is connected to a drive unit for a height-adjustable build platform and is configured to control the drive unit, the height of the build platform can be adjusted by the processing unit as a function of the captured force. The drive unit enables the build platform and thus the body to be processed or post-processed (by washing and/or post-exposure) to be moved at least along one axis. Optionally, the drive unit, the build platform and/or the body, is designed to advance the build platform and/or the body to certain post-processing points in the post-processing equipment. The drive unit can have an electric motor, for example, a stepping motor, which is connected to the build platform. Particularly, the electric motor can be connected to a height-adjustable rod which is connected to the build platform via the force sensor, the force sensor being configured to measure the force in at least one direction. The exposure chamber can have a light source, for example, a cluster and/or an array of light sources, particularly a source for visible light or UV light. The radiation intensity and/or the exposure time generally have an influence on the final properties of the body which is post-crosslinked or finally crosslinked using this radiation intensity and/or exposure time.

In order to be able to control the system expediently, it is further advantageous when the force sensor is coupled via the processing unit to a database that has the original information (for example, CAD data, volume, material density and/or weight) of the body in order to determine whether a body is present (stuck) on the build platform when it is initially placed in the cleaning tank (or "wash box") in the post-processing equipment. This prevents the senseless/empty execution of a washing and post-exposure step or an entire post-processing sequence without a component on the build platform.

In addition, error states in the post-processing process can optionally be reliably ascertained and/or avoided using the processing unit. Furthermore, the post-processing device, more precisely the processing unit, can be configured to automatically recognize errors in the process sequence and to inform the user about them or to react appropriately to the errors that occur by means of a controller.

The disclosed system may optionally comprise a printing unit suitable for additive manufacturing a body from a substance curable by radiation, wherein the system has two distinct operational modes: a first operational mode, during which the printing unit can be operated, and a second operational mode, during which the printing unit is idle and the cleaning tank and/or the exposure chamber can be used. The force sensor is configured to be used at least in the second operational mode of the system, i.e. when the system is configured to perform post-processing tasks.

Within the scope of the present disclosure, the system may alternatively be a dedicated post-processing system, e.g. dedicated to cleaning and/or post-exposure of a body manufactured by means of an additive manufacturing method. For example, the system may be without a printing unit suitable for additive manufacturing.

Optionally, the processing unit can be configured to compare the force signal with a predefined expected value for a current process step and, depending on the resulting deviation, to stop the drive and/or to output an error signal and/or to set a method parameter. Accordingly, in the disclosed method, the processing unit can compare the force signal with a predefined expected value for a current process step and, depending on the resulting deviation, stop the drive and/or output an error signal and/or set a method parameter.

Optionally, it can be provided that a detachment of at least one body from the build platform during a sub-step of the post-processing method is detected from the force captured using the sensor. When a body is detached from the build platform, for example, due to incomplete adhesion and/or component shrinkage that occurs during post-exposure, the change in weight of the build platform can be determined via the force sensor and an error can be output, for example. For example, in order to determine a detachment of a body before, during or after a sub-step of post-processing, the force sensor can be read by the processing unit at least in a time interval of, for example, 0.01 s (seconds) to 60 s or continuously and, if necessary, to be compared with a target value (expected value).

According to a further embodiment of the disclosed system and method, it can be provided that the predefined expected value is loaded from a database for comparison in order to compare the target weight of the component or the build platform with the ideal weight value from the database after at least one washing process. For example, it can be determined whether and how much cleaning fluid is still wetting the processed body and whether the body has already been cleaned sufficiently (for example, liquid residual resin no longer adheres to the component) and is therefore suitable for post-exposure. The expected value can expediently be calculated in any sub-step of the post-processing as a function of at least one method parameter from the processing unit and possibly from a known geometry of the body and/or the material data. Accordingly, an expected force value can be calculated by the processing unit for a specific value of a method parameter or for a plurality of specific values of a plurality of process parameters. The processing unit can also calculate a series of expected values of the force for a series of specific values of one or more method parameters. The calculation can be carried out using simulation software, for example, using the component weight.

Particularly, it can be provided that the drip-off time of the cleaning fluid is determined on the basis of the calculated data and can then be compared, for example, through the decrease in the force signal or body weight over time, to prevent or minimize contamination of the post-processing equipment, or parts thereof with cleaning fluid and/or dissolved resin. In detail, it can be provided that the cleaning state can be determined as a function of a target weight for a body. For example, a maximum drip-off time or evaporation time (for volatile solvents) can be specified and after this time the difference between the target weight and the actual weight can be determined. If there is a difference that is greater than 0.1% to 10%, for example, liquid, undissolved resin may still remain on the component. This would mean that the washing process was unsuccessful and would have to be repeated.

Furthermore, it can be provided that, on the basis of the force value captured by the sensor, the height/position of the build platform or the movement speed in relation to the component and the geometric boundary conditions of the post-processing equipment and/or a drip-off time or drying time of the cleaning fluid and/or the weight of at least one component is determined as a method parameter in the processing unit when the build platform together with the component is deflected from the rest position by movements of the build platform. Thus, by comparing the expected value with the force captured by the sensor on the stated height of the build platform or the presence of a body, the movement speed of the build platform and/or the amount of cleaning fluid remaining on the body after washing and/or the displacement of the body are finished while the cleaning fluid is being pumped in. For example, with increasing duration of the so-called drip-off time of the cleaning fluid, the weight of the body and thus the captured force decreases and increasingly approaches the pure (dry) weight of the body, with which a conclusion can be made about the degree of cleaning of the body. However, a resin that is more difficult to dissolve effects a greater force value even after washing, since more resin sticks to the component. Such characteristic properties of the curable substance used can be taken into account when determining the expected value.

As an alternative to certain captured individual values of the force, a relative or absolute change in the force in the course of at least a sub-section of the cleaning process can also be used by the processing unit to control the aforementioned process control variables.

The force sensor can comprise (at least) one strain gauge for a cost-effective implementation. For example, a so-called strain gauge sensor or a strain gauge bridge can be used to determine the force and provide the force signal. Conclusions can be drawn about the force progression by measuring parameters related to the force value (for example, the motor current of a drive of the transport device).

Furthermore, the processing unit can be configured to determine and output a state of the body, a state of the system and/or a state of a part of the system on the basis of the force signal. Accordingly, in a further optional variant of the disclosed method, the processing unit can determine and output a state of the body, a state of the system and/or a state of a part of the system on the basis of the force signal.

According to a further variant, the processing unit can be configured to compare the force signal with an expected value and/or with a range of an expected value and to adapt a movement, a movement speed, an acceleration and/or a process time of the transport device on the basis of the force signal. Similarly, in the disclosed method, it can be provided that the processing unit compares the force signal with an expected value and/or with a range of an expected value and adapts a movement, a movement speed, an acceleration and/or a process time of the transport device on the basis of the force signal. In this case, the processing unit functions as a control unit for controlling the transport device, for example, at least one drive or a position unit of the transport device. The expected value or range of the expected value can be specified statically and/or at least, partially as a function of time (that is, as a course of expected values and/or as a course of at least one limit of a range of expected values). Alternatively or additionally, the expected value can also be specified as a function of at least one (different) method parameter and calculated by the processing unit. The expected values can be stored in a memory, for example, in the form of an ideal model or course of state variables and/or states during the individual process steps, so that they can be loaded from there by the processing unit and compared with a force signal. For example, a currently captured force or a change in the captured force over time (for example, differential or derivative with respect to time) can be determined and at least one method parameter can be can be set or controlled as a function of the difference between the captured force or its change over time on the one hand and a corresponding expected value (or a course of expected values) on the other hand, or only as a function of the change in the force captured over time. The value of the method parameter can also be captured by the force sensor. Particularly, by repeatedly comparing the force captured using the force sensor with an expected value and/or with a range of expected values of the force, the method parameter can be set or regulated to a target value. The method parameter can be set by the processing unit itself or controlled thereby.

In detail, for example, changes in the force signal captured using the force sensor can be processed in the processing unit connected to the force sensor in a mathematical model and at least one method parameter can be processed as a function of at least one captured force signal (for example, measured force value) and/or the change in captured force signals can be set according to a mathematical specification modeled value and/or behavior. The underlying mathematical model can also take into account, for example, a time curve and/or a (different) method parameter as an input value.

In context of the disclosed method, the force signal can be captured during and/or after each partial process step and, if necessary, evaluated (for example, compared with an expected value).

For example, the processing unit can be configured in interaction with the force sensor to control and optimize a washing process (that is, for cleaning a manufactured body). According to a further embodiment of the method, it can be provided, for example, that the saturation of a cleaning fluid can be determined as a function of the values captured using the force sensor. The density of the cleaning fluid is steadily increased with each washing process by the dissolution of non-cured photo resin from the component during the cleaning process. If an empty build platform or a build platform loaded with a body is now introduced into the cleaning tank and washing fluid is poured in (for example, pumped in), the buoyancy that occurs can be compared with a target value using the force sensor. If this deviates to a certain extent, the density of the cleaning fluid has increased and thus it has become saturated with dissolved resin to a certain extent. Should this saturation and thus the buoyancy force exceed a threshold value which is specified by a database, for example, then the cleaning fluid can be assumed to be saturated. Additionally or alternatively, a fill level of a cleaning fluid in the cleaning tank can be determined on the basis of the buoyancy that can be determined using the force sensor and it can be determined whether this has reached a certain value. This value can be a minimum fill level or a maximum fill level, for example.

The processing unit can, optionally, based on the force signal, determine a deflection of the transport device (or on the basis of a corresponding height of the build platform) and/or a height of the body in relation to a cleaning tank and/or an exposure chamber and/or a movement speed of the transport device and/or the weight of the body and/or the volume of the body and/or a waiting time (for example, until cleaning, drying or post-exposure has concluded) as method parameters. This determination can foe provided as a snapshot or as continuous monitoring, for example, while the body is being moved using the transport device. The volume of the body can, for example, be derived from a buoyancy force of the body in a fluid measured using the force sensor. It can preferably be provided that the force captured using the sensor can be used to draw conclusions about the cleaning fluid "trapped" due to the geometry of the body, that is, about the formation of wells/cavities that can store or hold cleaning fluid (basins).

In addition, it can be provided that the continued presence of the component on the build platform can be detected from the force signal in combination with further automation. For example, whether the build platform is free for renewed use can be determined from the weight or the inertia of the build platform.

Finally, a positioning error or an error in the automatic build platform pick-up can be detected when the force captured using the force sensor is measured before the build platform is picked up and a predetermined force value is exceeded after the pick-up. The force value is preferably captured using the force sensor, and the movement of the build platform is counter-regulated based thereon by the processing unit in order to avoid damage from excessive forces in the system.

In the context of continuous monitoring, for example, the occurrence of a collision (crash) and the exceeding of certain predetermined force threshold values can be detected, the force on the build platform as the carrier of the body being able to be changed by process-related deflections. For example, according to a further embodiment of the system, it can be provided that a determined force is compared with a maximum permissible force during the method/positioning and manipulation of the build platform, together or without bodies, in order to anticipate collisions with equipment parts and/or lost bodies in a timely manner and thereby to detect (for example, cleaning tank available) or prevent it. A body incorrectly (for example, incompletely) detached from the build platform can lead to a collision when the build platform approaches a process position and can also cause an increase in the force value, which is registered by the processing unit and leads, for example, to an emergency stop of the transport device.

BRIEF DESCRIPTION OF THE DRAWINGS

The invention is explained in more detail in the following using preferred, non-limiting exemplary embodiments with reference to the drawings. Shown are:

FIG. 15 schematically a diagram having an exemplary time profile of a force signal when there is a collision according to FIG. 14.

DETAILED DESCRIPTION

In the illustrated figures, parts of the device that do not serve to describe the respective figure have been omitted for the sake of clarity.

Figure 1:
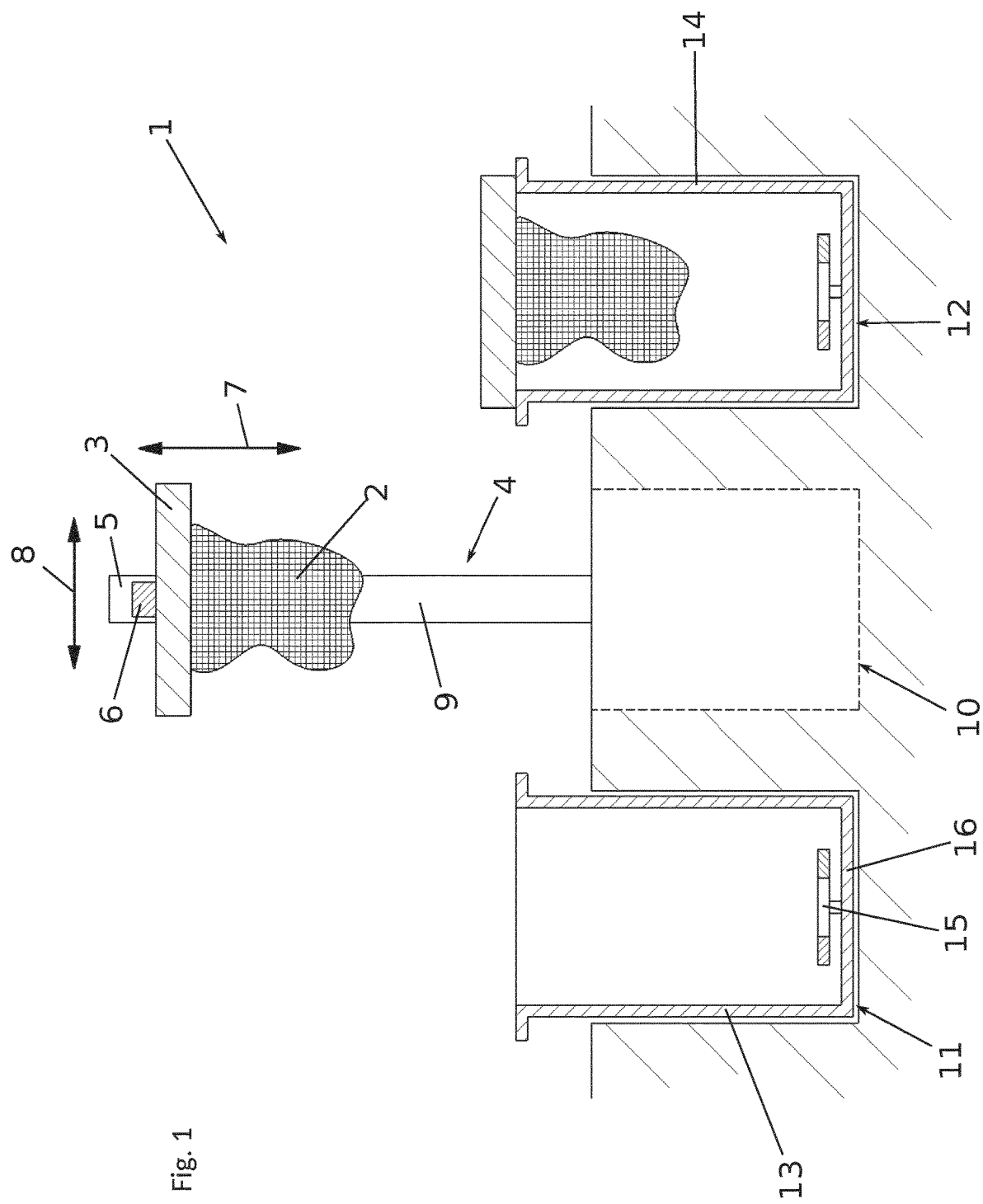
FIG. 1 schematically a longitudinal section of a system for cleaning and post-exposure of a body built up in layers.

System 1 for cleaning and/or post-exposure of a body 2. The body 2 was previously manufactured from a substance curable by radiation by means of an additive manufacturing method. Production takes place on a build platform 3. In the situation illustrated in FIG. 1, the build platform 3 is connected to a transport device 4 of the system 1. For example, an arm 5 of the transport device 4 can have a coupling 6 for connection to a correspondingly configured build platform 3. Using the transport device 4, a connected build platform 3 can be moved in the vertical direction 7 (that is, normal to a building surface of the build platform) and in the horizontal direction 8. For vertical movement, the transport device 4 has a tower 3 which is arranged on a rail (not illustrated) for horizontal movement. The system 1 has a post-exposure unit 10 and two receptacles 11, 12 for cleaning tanks 13, 14 for cleaning the body 2. A circulating device 15 in the form, of a rotor is provided in the cleaning tanks 13, 14 on the bottom 16 of the tank 13, 14. A body 2, and possibly a transport container, can be transported on a build platform 3 between these stations 10, 11, 12 by means of the transport device 4. That is, the body 2 can be lifted vertically out of a transport container, moved horizontally over a cleaning tank 13 and then lowered vertically into the cleaning tank 13. After cleaning, the body 2 can, for example, move over the post-exposure unit 10 and then be lowered vertically into the post-exposure unit 10. The post-exposure unit 10 can, for example, have a (partially transparent) exposure chamber for post-exposure of the body 2 having corresponding light sources directed into the chamber.

Figure 2:
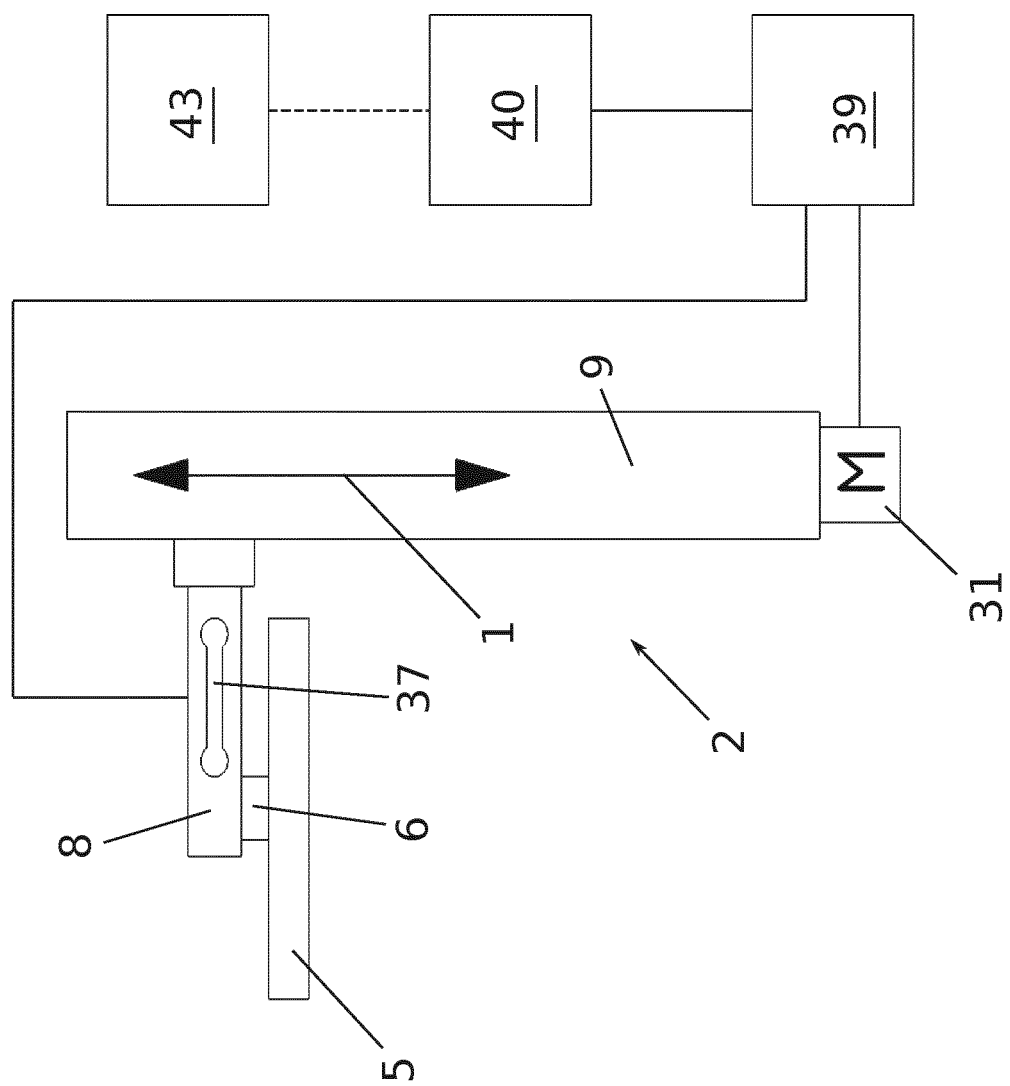
FIG. 2 schematically a more detailed view transport device of the system according to FIG. 1, this time without a body.

As illustrated in more detail in FIG. 2, the transport device 4 comprises a drive 17 for the above-described vertical and horizontal movement of a connected build platform 3. The transport device 4 also comprises a force sensor 18. The force sensor 18 comprises a strain gauge which is arranged in the arm 5 between the tower 9 of the transport device 4 and the coupling 6 for the build platform 3 and which records a deformation of this arm 5. The force sensor 18 is thus configured to capture a force acting on the build platform 3, the force being generated either by the transport device 4 (for example, by the drive 17) and/or by the body 2 (for example, gravity) and/or from the outside (for example, buoyancy force, see below). The force sensor 18 is connected to a processing unit 19. The processing unit 19 is configured to control the drive 17 and to output process parameters based on the force signal of the force sensor 18 to a user interface 20. The user interface 20 is configured for communication with a data memory 21 which, for example, stores a model of the body 2 and specifications for post-processing the body 2. The data memory 21 can, for example, be part of a transport container. The processing unit 19 is configured to determine and output a state of the body 2, a state of the build platform 3 or a state of a cleaning tank 13, 14 (more precisely: its fill level) on the basis of the force signal. For this purpose, the processing unit 19 is configured to compare the force signal with an expected value or with a range of an expected value and to adapt a movement, a movement speed, an acceleration and/or a process time of the transport device on the basis of the force signal. Particularly, the processing unit 19 can stop the drive 17 and/or output an error signal and/or set a method parameter as a function of a discrepancy between the force signal and the expected value.

In the situation illustrated in FIG. 2, the build platform 3 is free, that is, no body is connected to the build platform 3. The force signal of the force sensor 18 corresponds to the weight of the build platform 3 when the transport device 4 is stationary. That is, on the basis of the force signal, the processing unit. 19 can determine that a build platform 3 is connected to the transport device 4, as well as the weight of said build platform 3. For a more precise measurement, the build platform 3 having the tower 9 can be set in a vertical movement or oscillation. The inert mass of the build platform 3 can be deduced from the resulting time profile of the force signal.

Figure 3:
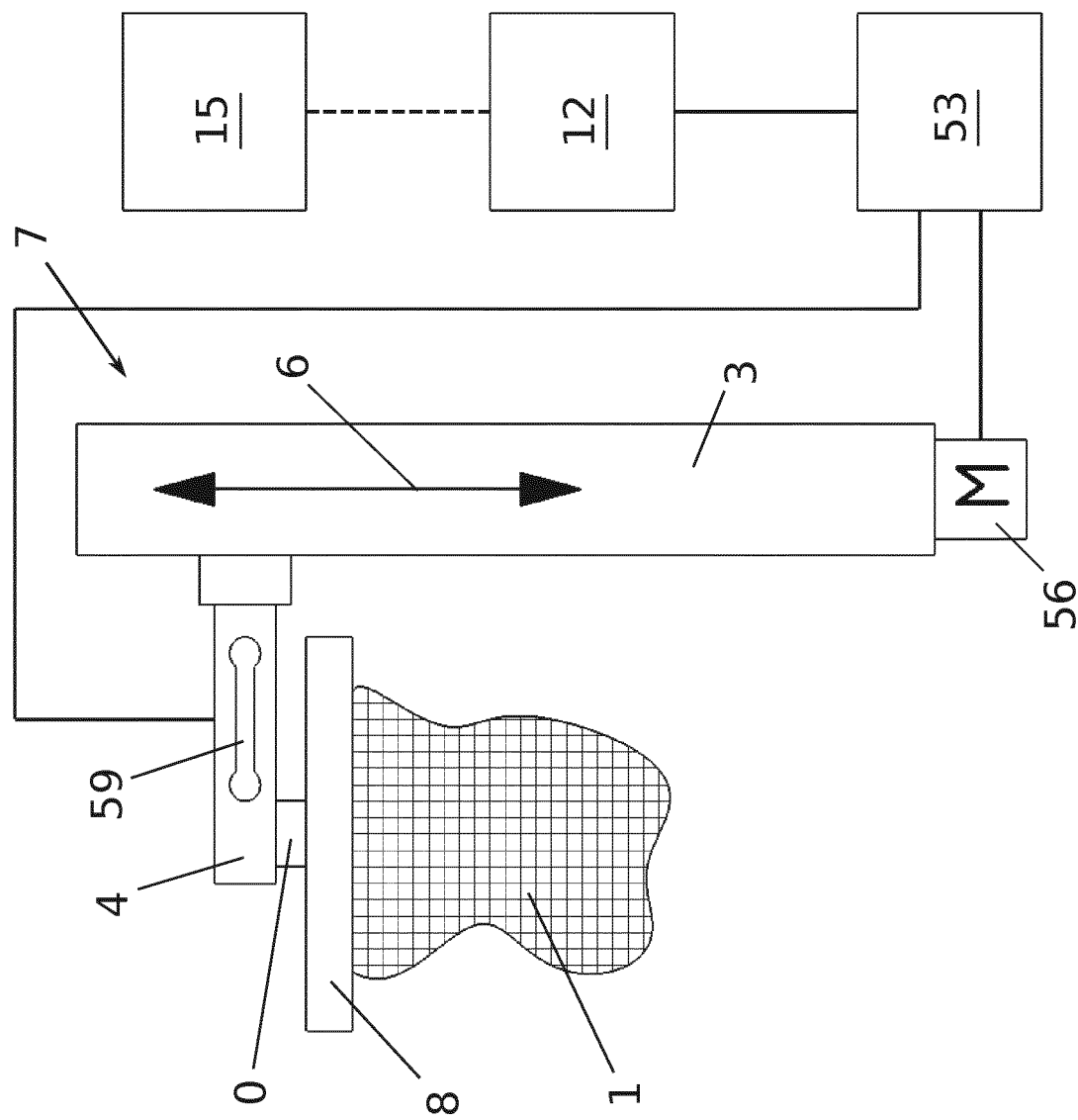
FIG. 3 schematically the view according to FIG. 2, this time having a body arranged on the build platform.

In the situation illustrated in FIG. 3, the transport device 4 carries a build platform 3 having a body 2 arranged (adhering) thereon. In this case, the weight of the body 2 together with the build platform 3 can be, derived from the force signal. If the weight of the build platform 3 is known (either as a default or measured beforehand, as in FIG. 2), the weight, of the body 2 can be determined separately. The weight of the body 2 can be compared with an expected weight based on a model. The expected weight is calculated from the density of the material used for manufacture (the photo-reactive substance) and the filled volume of the body 2. The density used can be the density after curing, that is, when the solvent has been completely deposited or separated. The progress of the post-processing can thus be concluded from the difference between the determined and expected weight. In detail, material residues still adhering can be recognized immediately after a washing process and the washing process can be continued. After the washing process, the dripping and draining of the cleaning fluid can be monitored.

Figure 4:
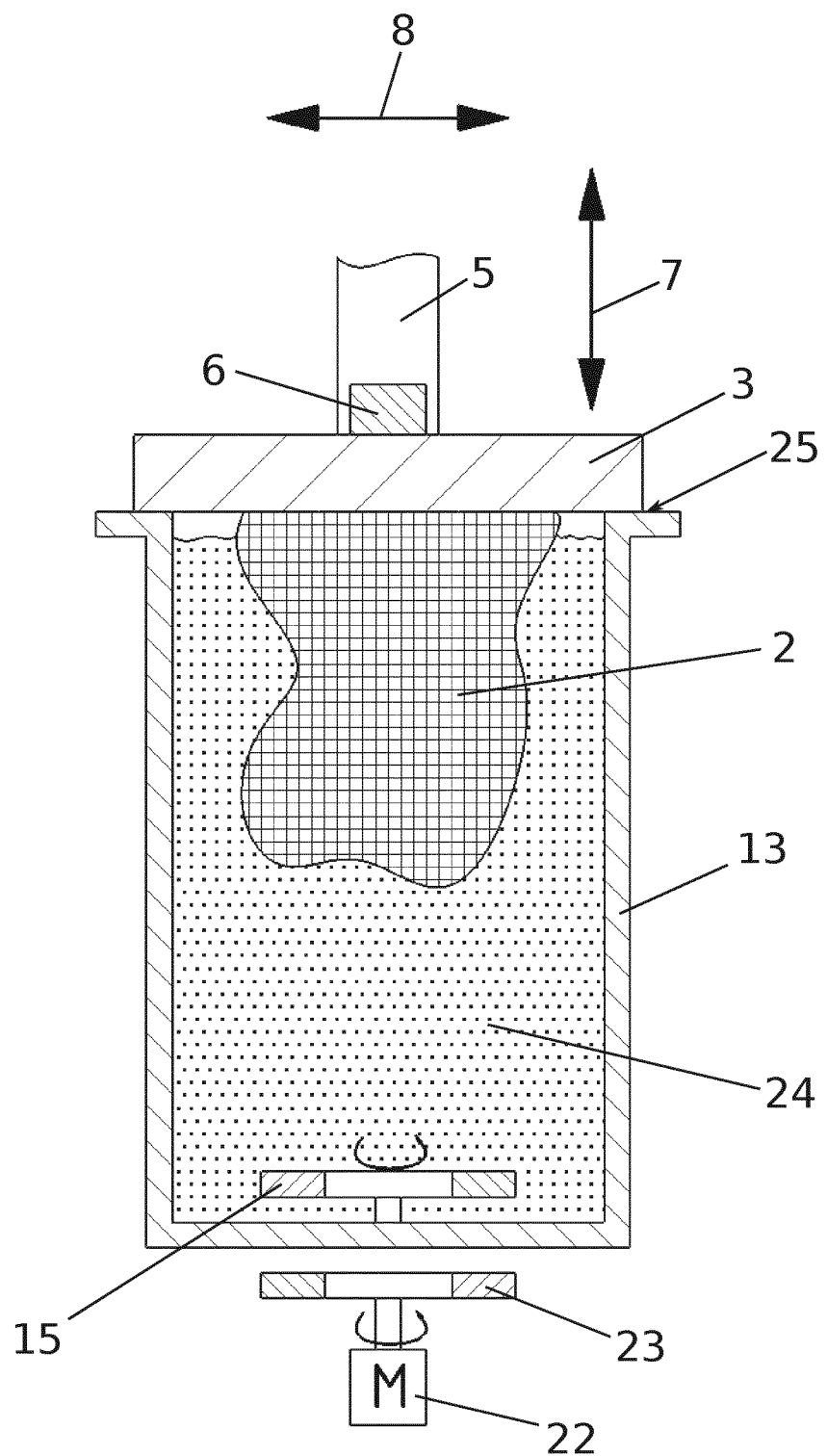
FIG. 4 schematically a longitudinal section of a detail of a system having a cleaning tank.

Such a washing process in the cleaning tank 13 is illustrated in more detail in FIG. 4. As can be seen here, the rotor 15 (for example, with permanent magnets) is rotated magnetically by a drive magnet 23 which is arranged below the tank 13 and is connected to an electric motor 22. As a result, the cleaning fluid 24 is circulated and homogenized in the tank 13. Material residues adhering to the body 2, for example, less cured, are rinsed off by the cleaning fluid 24 in this way and collected in the tank 13. During this process, the build platform 3 is lowered onto the cleaning tank 13 and closes tightly with its edge 25 in order to prevent the cleaning fluid from escaping. The contact between the build platform 3 and the tank edge 25 and any contact pressure can be determined and monitored using the force sensor 18. The foody 2 is essentially completely immersed in the cleaning fluid 24 due to the correct fill level of the cleaning fluid 24.

Figure 5:
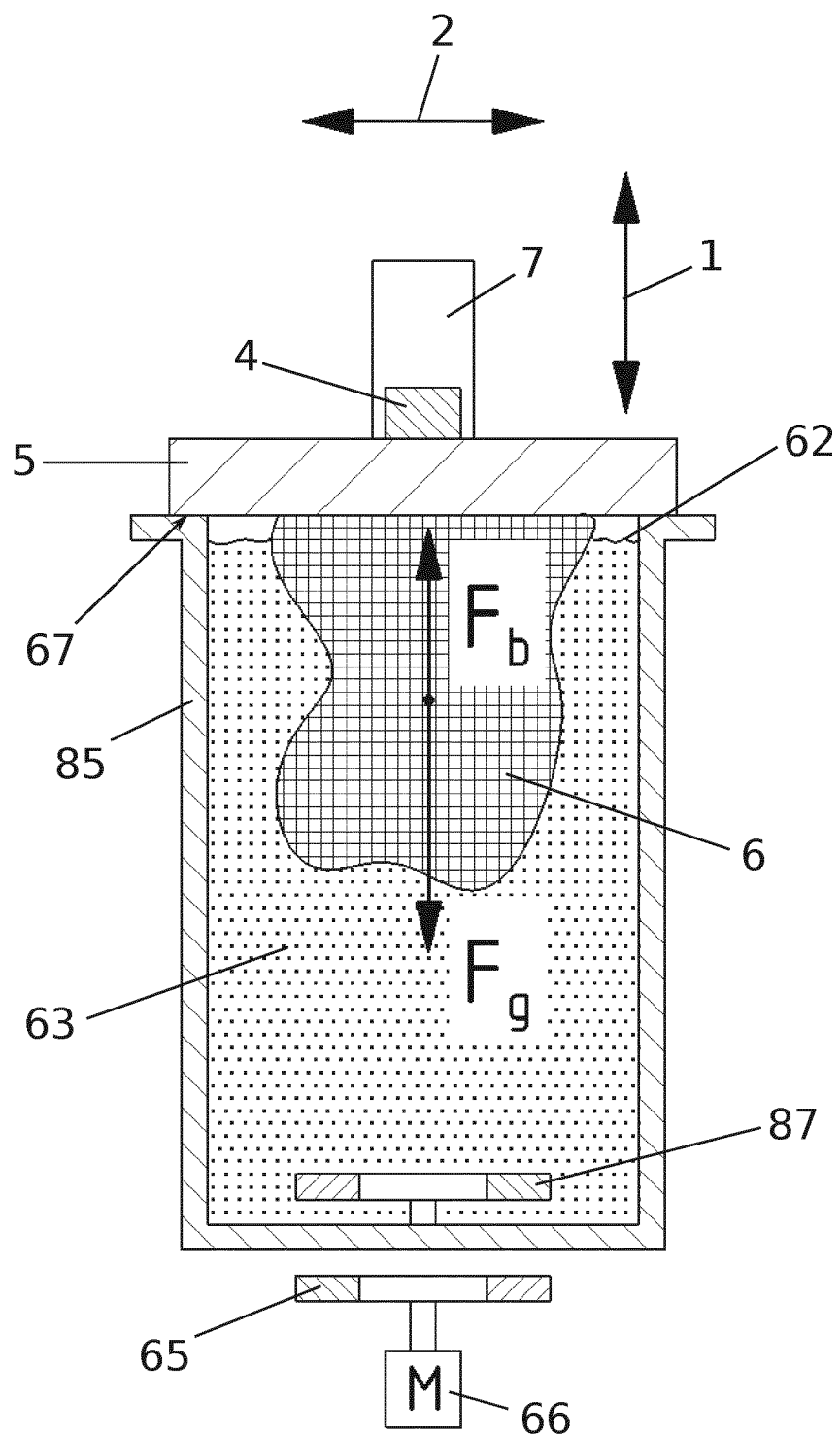
FIG. 5 schematically a cleaning tank according to FIG. 4 with the acting forces.

The acting forces that are captured by the force sensor 18 are delineated in FIG. 5. On the one hand, as in FIG. 3, the force of gravity Fg acts according to the weight of the body 2. On the other hand, and in opposition to the force of gravity Fg, the buoyancy force Fb acts due to the weight of the cleaning fluid 24 displaced by the body. The buoyancy force Fb thus depends, on the one hand, on the immersed volume of the body 2 and also on the density of the displaced cleaning fluid 24. The immersed volume of the body 2 in turn depends or, the fill level of the cleaning fluid 24 in the cleaning tank 13.

Figure 6:
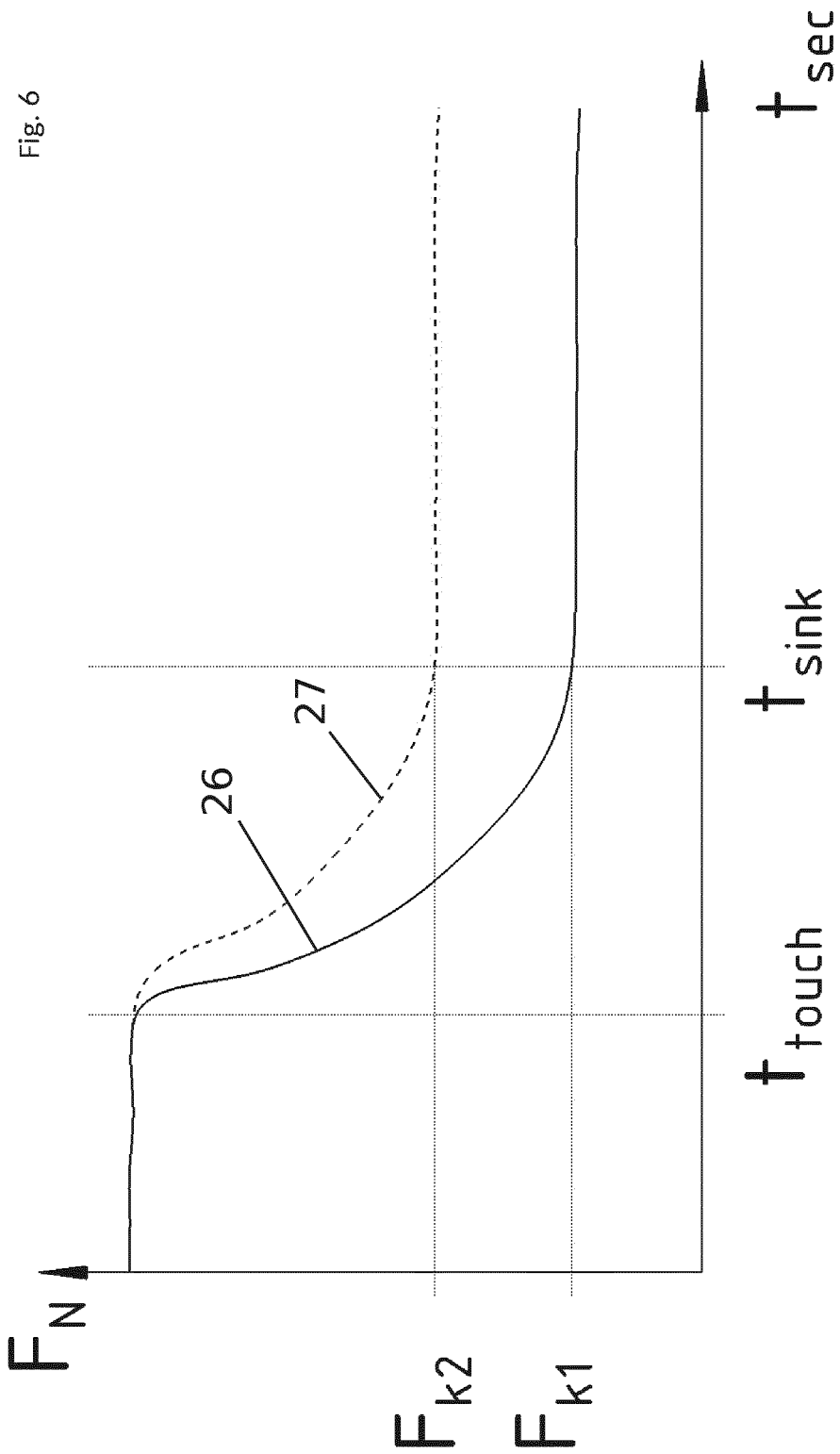
FIG. 6 schematically a diagram having an exemplary time profile of a force signal when immersed in a cleaning fluid as in FIG. 5, with different fluid densities.

FIG. 6 shows the time profile of the force signal FN when the body 2 is lowered into the cleaning tank 13 for two different situations 26, 27 (solid or dashed line) for the same body 2. The point in time ttouch of the first contact with the cleaning fluid 24 by the body 2, that is, at which the body 2 reaches the fluid level 28 (see FIG. 5), and the point in time tsink of the complete lowering of the body 2 into the cleaning fluid 24 are delineated. The influence of placing the build platform 3 on the edge 25 of the cleaning tank 13 is not illustrated for the sake of simplicity. The point in time ttouch is essentially the same in both situations, that is, the fill level is also the same. Nevertheless, the situations differ in the force signal captured at the point in time tsink, where the force signal in the first case 26 (solid line) drops to a force Fk1 and in the second case 27 (dashed line) drops to a (higher) force Fk2. This difference is due to the different density of the cleaning fluid 24. In the first case 26, this density is higher, that is, the buoyancy force Fb is higher and thus compensates for a larger part of the weight Fg of the body. The resulting force Fk1 is therefore lower. In the second case 27, the density of the cleaning fluid 24 is lower, so that the resulting force Fk2 remains higher. The density of the cleaning fluid 24 which can be determined by the processing unit 19 in this way can be used for diagnostic purposes. For example, an exchange of the cleaning fluid 24 can be recommended to the user when the composition of the cleaning fluid 24 is clearly no longer suitable for washing due to the changed density.

Figure 7:
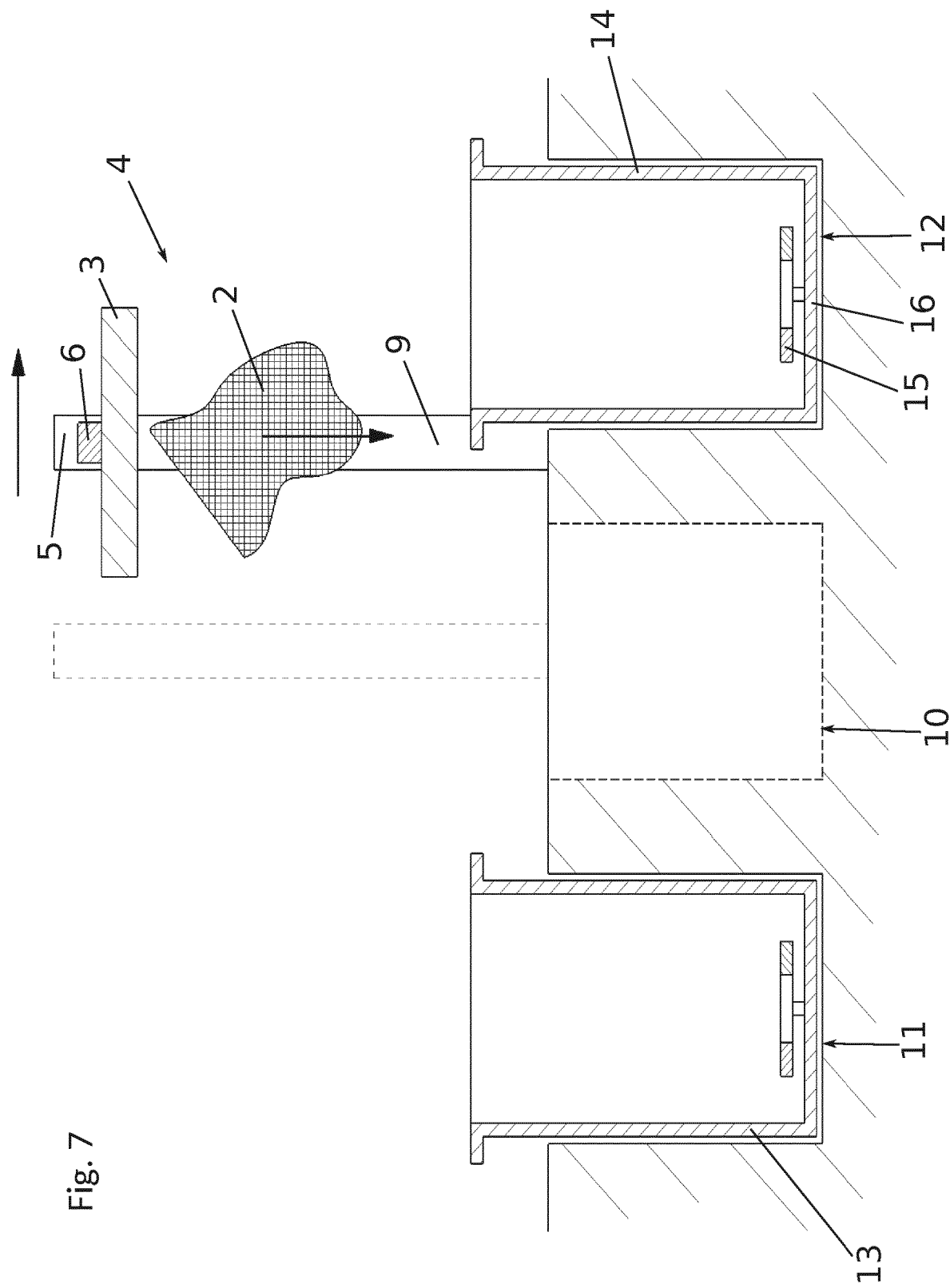
FIG. 7 schematically the system from FIG. 1, the body having come loose during a movement.
Figure 8:
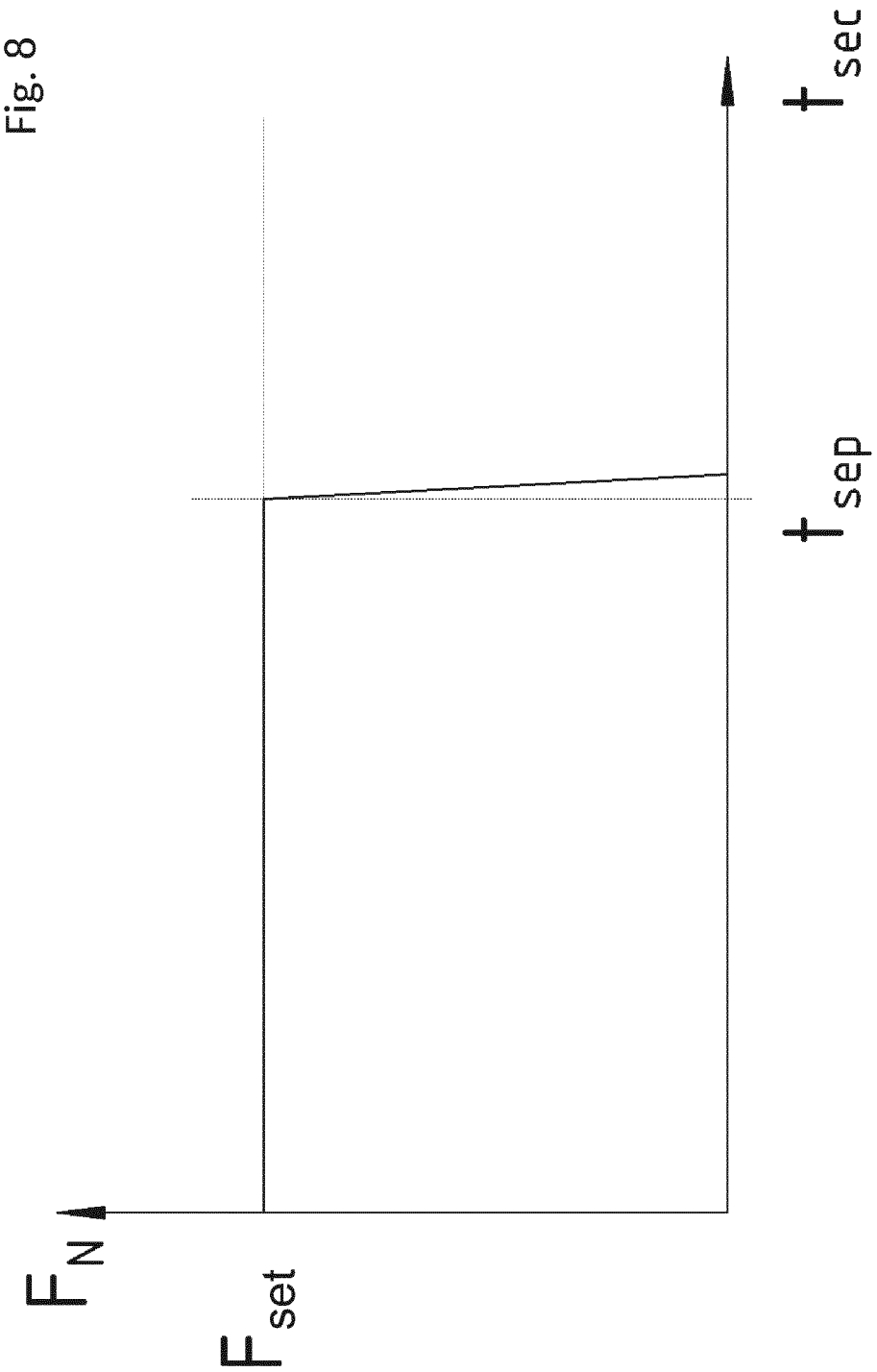
FIG. 8 schematically a diagram having an exemplary time profile of: a force signal when the body is spontaneously detached from the build platform according to FIG. 7.

FIG. 7 shows a situation in which the body 2 is detached from the build platform 3 during transport and falls down. This event can be recognized by the processing unit IS. The time profile of the force signal FN corresponding to this situation is illustrated in simplified form in FIG. 8. The detach point in time tsep is delineated here. The abrupt change in the force signal FN and the deviation from the expected value Fset corresponds to a detachment of the body 2 (or the build platform 3). This case can be recognized, for example, by the fact that the derivation of the force signal (that is, the slope of the flank at point in time tsep) exceeds a limit value of expected changes (for example, when immersing in the cleaning tank).

Figure 9:
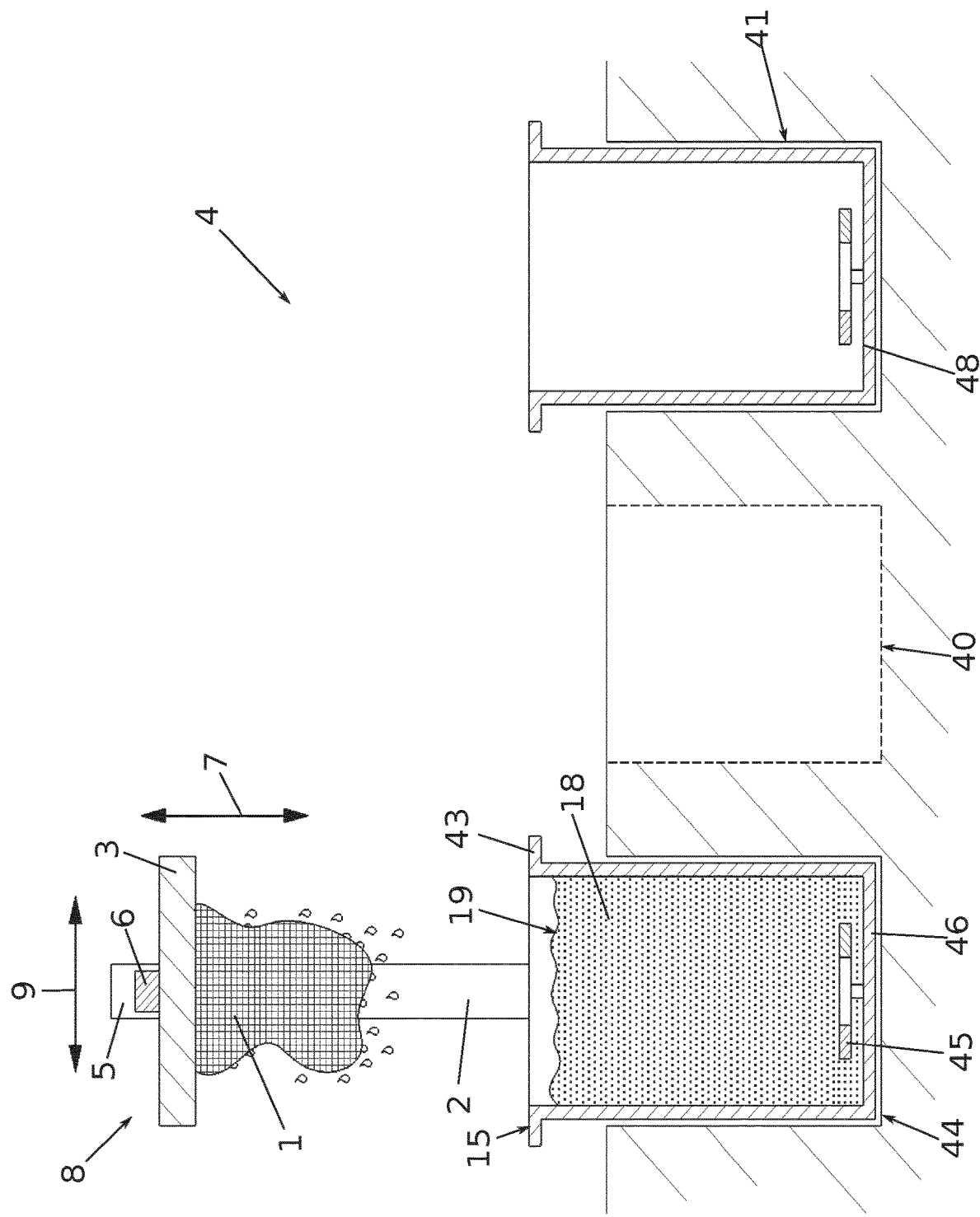
FIG. 9 schematically the system from FIG. 1 having a body wetted with cleaning fluid after washing.
Figure 10:
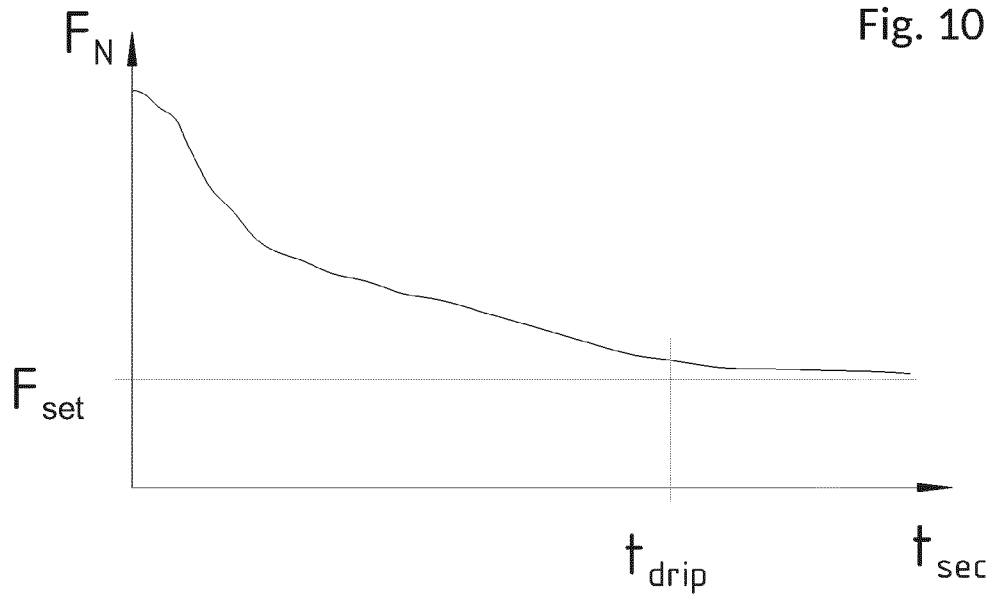
FIG. 10 schematically a diagram having an exemplary time profile of a force signal when the cleaning fluid drips off according to FIG. 9.
Figure 11:
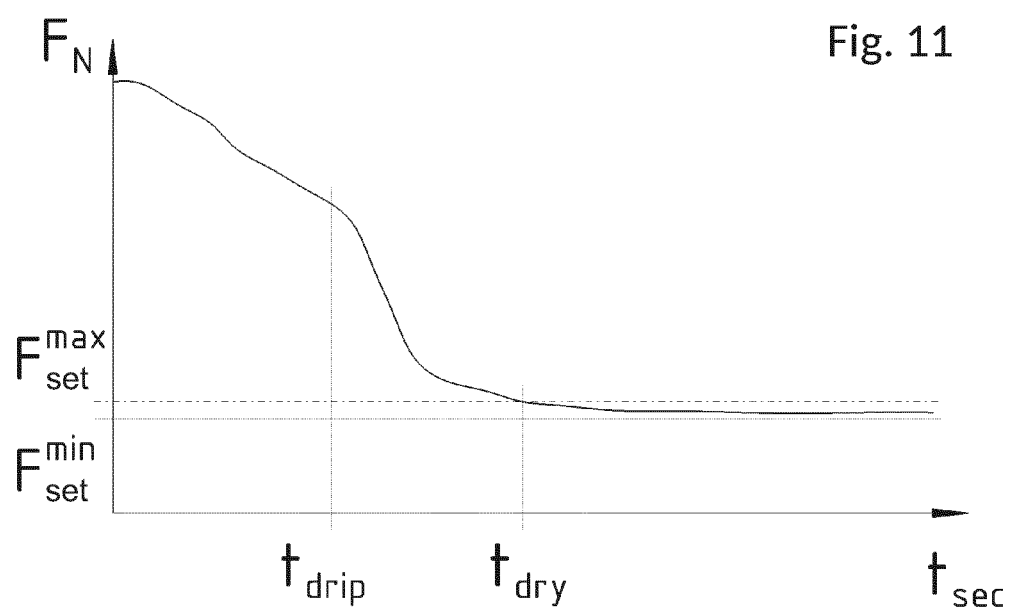
FIG. 11 schematically a diagram having an exemplary time profile a force signal when the cleaning fluid is drained and blown off according to FIG. 9.

FIG. 9 shows a situation after the body 2 has been washed in the cleaning tank 13 according to FIG. 4, the body 2 being completely lifted vertically out of the cleaning fluid 24. Immediately after being lifted out, the cleaning fluid 24 drips off the body 2 and back into the cleaning tank 13. The body 2 is held in this position until most of the cleaning fluid 24 has dripped off. In order to avoid delays, it is advantageous to recognize this point in time as a function of the geometry of the body 2. The force sensor 13 can also be used for this purpose. The time course of the force signal FN during this process is illustrated in FIG. 10. The processing unit 19 monitors the force signal FN and detects a point in time tdrip at which the force signal FN has sufficiently approximated an expected value Fset (that is, up to a predefined acceptable deviation). After the lifting out, the system 1 waits for the point in time tdrip and then continues further post-processing (for example, with post-exposure). Alternatively, the dripping off, after a certain amount of dripping cleaning fluid 24 (recognizable by the change in the captured gravity after lifting it out), can be supplemented by blowing off. This case is illustrated in simplified form in FIG. 11. Here, a blower is switched on at the point in time tdrip and operated until the point in time tdry of sufficient drying. This point in time tdry is recognized by the fact that the force signal FN enters the range Fsetmin-Fsetmax of expected values. The blower can be deactivated at point in time tdry and further post-processing (for example, with post-exposure) is continued.

Figure 12:
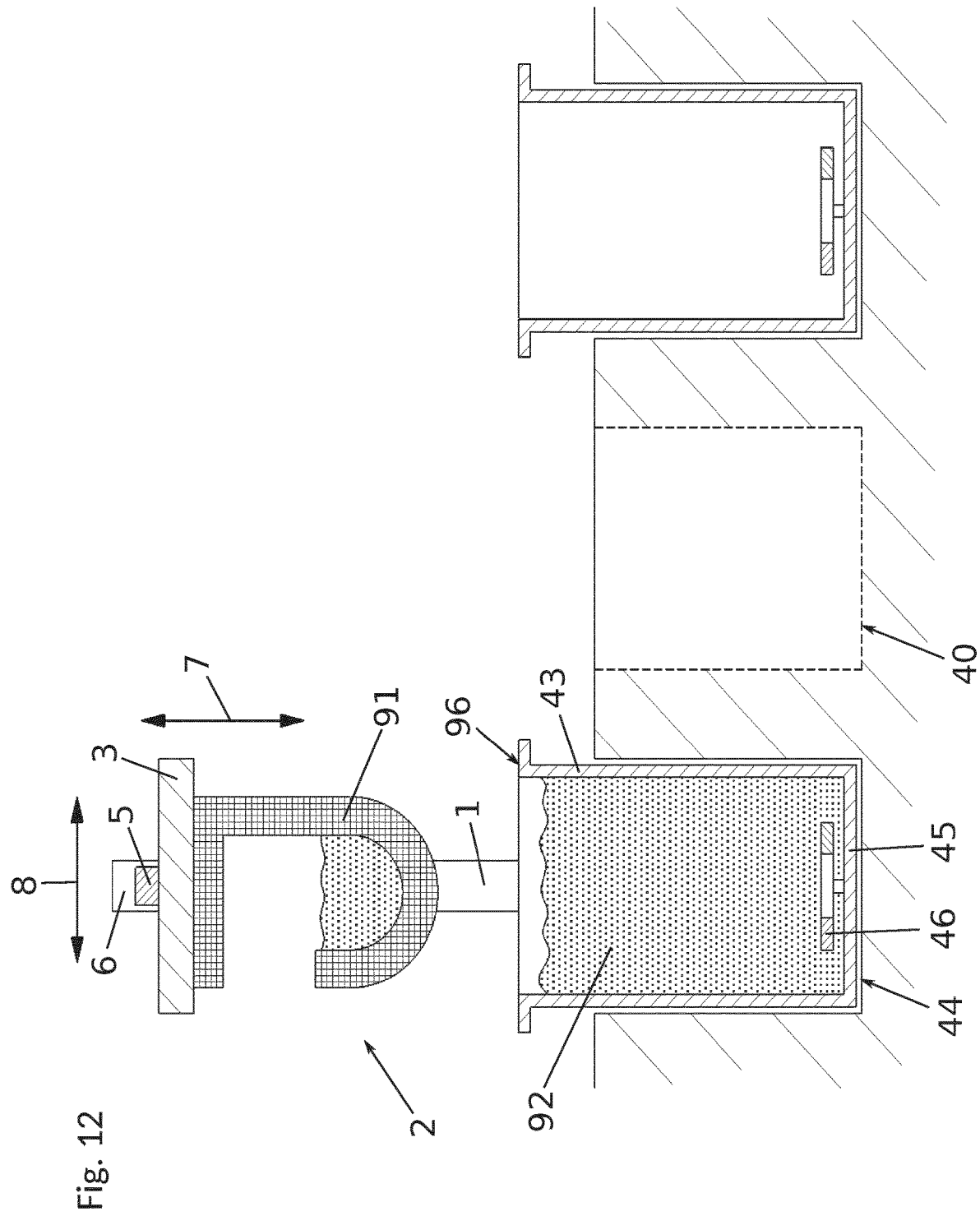
FIG. 12 schematically the system from FIG. 1 having an incompletely drained body.
Figure 13:
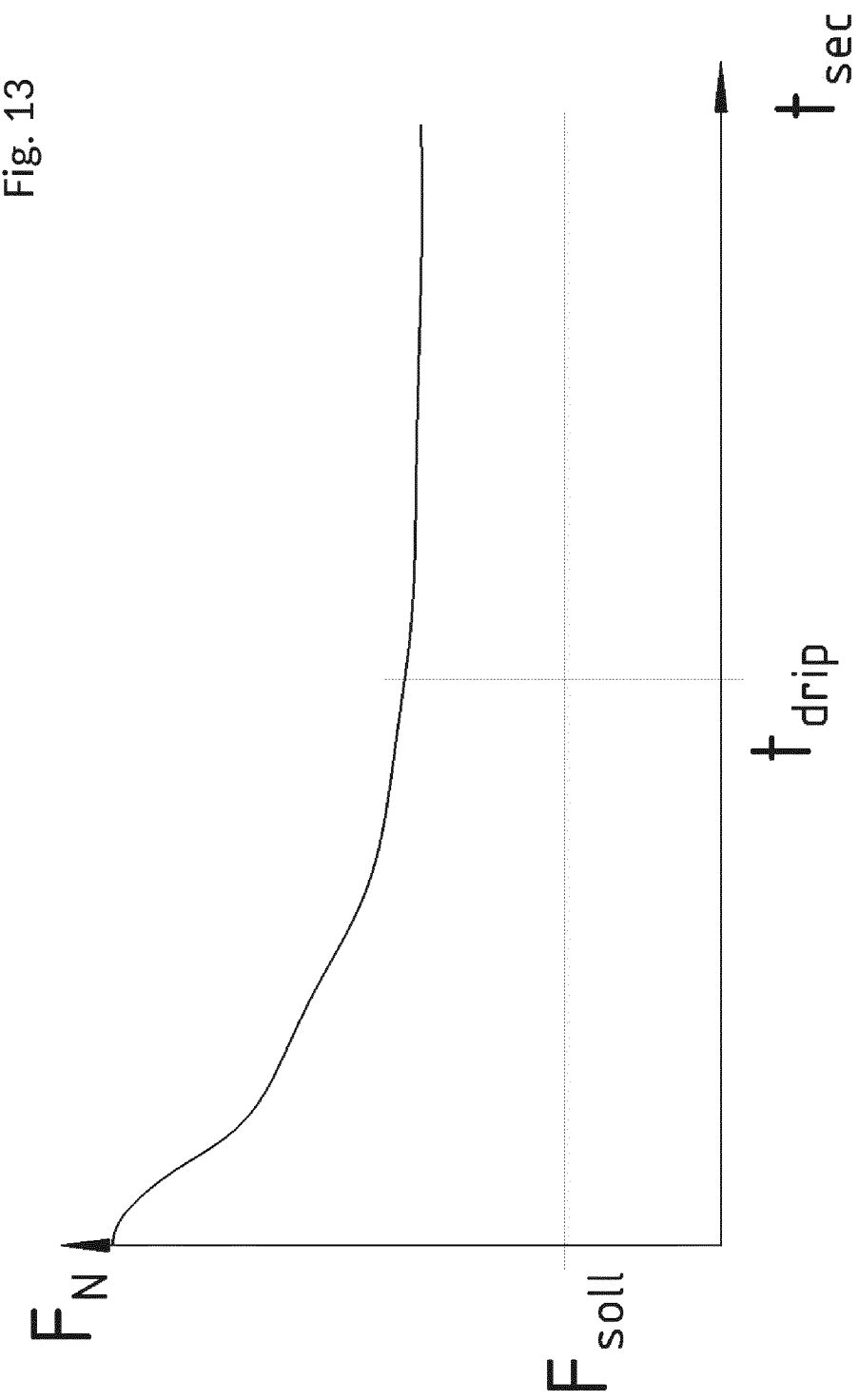
FIG. 13 schematically a diagram having an exemplary time profile of a force signal when the cleaning fluid incompletely drips off according to FIG. 12.

An error in the dripping process is illustrated in FIG. 12, exaggerated for the sake of simplicity. In this case, the body 29 forms a "basin" in which cleaning fluid 24 is held. Therefore, in this case, cleaning fluid 24 is scooped up with the body 29 from the cleaning tank 13 and cannot drip off. This case can be recognized by the processing unit 19 from the fact that the force signal FN, as illustrated in FIG. 13, does not sufficiently approximate the expected value Fset for a body 29 that has dripped off. Here, after an expected (or maximum) drip-off time tdrip, the remaining deviation can be recognized and an error can be output and the post-processing can be interrupted or canceled.

Figure 14:
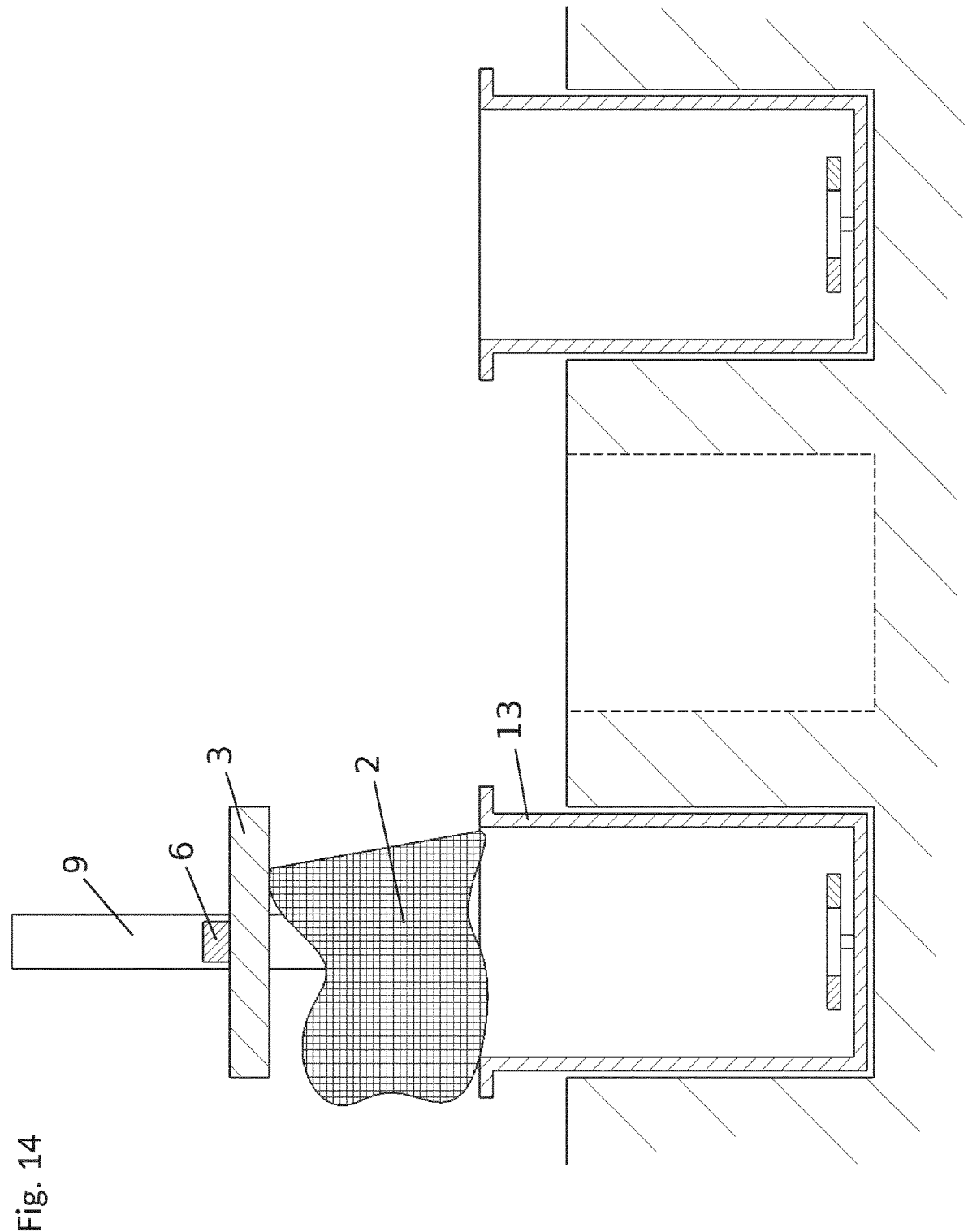
FIG. 14 schematically the system from FIG. 1 having a possible, collision of an incorrectly detached body.

Finally, FIG. 14 shows an error case in which the body 2 has detached itself from the build platform 3 above a cleaning tank 13 and is now lying across the cleaning tank 13. In this case, the build platform 3 will collide with the body 2 when it is lowered into the cleaning tank 13. The corresponding time profile of the force signal FN is shown in FIG. 15. When lowering, the force suddenly begins to increase, the slope corresponding to the force applied by the drive 17 of the transport device 4 and which would also be expected, for example, when it is placed on an edge 25 of the cleaning tank 14. For this reason, the rapid positive change in force in itself is not a reason for cancellation. As soon as the force reaches a predefined maximum value Fmax, however, the processing unit 19 stops the drive 17 of the transport device 4 in order to avoid damage to the system 1. Since at this point in time no immersion in the cleaning fluid 24 as according to FIG. 6 was detected, the processing unit 19 can determine that an error is present and cancel the post-processing and display a corresponding indication with an error message to the user.

The invention claimed is:

1. A method for post-processing of a body manufactured using an additive manufacturing method, comprising:
   providing a build platform, a transport device having a drive and a force sensor, and a processing unit, wherein the build platform is connected to the drive of the transport device, and the processing unit is connected to the drive and the force sensor of the transport device;
   moving the body on the build platform, by the transport device comprising the drive, into a cleaning tank for cleaning or into an exposure chamber for post-exposure to perform the post-processing;
   measuring, by the force sensor, during cleaning, a force acting on the build platform generated due to the drive, a gravity of the body, and a buoyancy of the cleaning fluid displaced, and generating a force signal with the force sensor indicative of the force acting on the build platform or measuring by the force sensor during post-exposure a force acting on the build platform generated due to the drive and a gravity of the body, and generating the force signal with the force sensor indicative of the force acting on the build platform;
   generating, using the processing unit, a weight of the body based on the generated force signal;
   generating, using the processing unit, an expected weight of the body based on a model in which the expected weight is generated from a density of a substance curable by radiation and a volume of the body;
   generating, using the processing unit, information about a progress of the post-processing based on a difference between the generated weight of the body and the expected weight of the body, the information comprising when the body has finished the post-processing; and
   controlling the drive based on the information to move the build platform out of the cleaning tank or the exposure chamber when the post-processing is finished.

2. The method according to claim 1, further comprising:
   comparing, by the processing unit, the force signal with a predefined expected value for a current process step and, as a function of the resulting deviation, stopping the drive and outputting an error signal or setting the process parameter.

3. The method according to claim 1, wherein the processing unit determines and outputs at least one of a state of the body, a state of the system, and a state of part of the system on the basis of the force signal.

4. The method according to claim 1, further comprising:
   comparing, by the processing unit, the force signal with an expected value or with a range of an expected value and adapting at least one of a movement, a movement speed, an acceleration, and a process time of the transport device on the basis of the force signal.

5. The method according to claim 1, wherein the processing unit, based on the force signal, determines as a process parameter at least one of a deflection of the transport device, a height of the body in relation to the cleaning tank or the exposure chamber, a movement speed of the transport device, and the weight of the body.

* * * * *